United States Patent

Nyilas et al.

[11] Patent Number: 6,059,539
[45] Date of Patent: *May 9, 2000

[54] SUB-SEA PUMPING SYSTEM AND ASSOCIATED METHOD INCLUDING PRESSURE COMPENSATING ARRANGEMENT FOR COOLING AND LUBRICATING

[75] Inventors: Charles P. Nyilas, Monroeville; Clifford H. Campen, Jr., Pittsburgh; Joseph M. Kujawski, Export, all of Pa.

[73] Assignee: Westinghouse Government Services Company LLC, Pittsburgh, Pa.

[ * ] Notice: This patent is subject to a terminal disclaimer.

[21] Appl. No.: 08/859,193

[22] Filed: May 20, 1997

Related U.S. Application Data

[63] Continuation-in-part of application No. 08/567,558, Dec. 5, 1995, Pat. No. 5,795,135.

[51] Int. Cl.[7] .............................. F04B 39/06; F04D 17/00
[52] U.S. Cl. ........................ 417/228; 417/414; 417/472; 417/368; 417/53
[58] Field of Search .................................. 417/228, 368, 417/414, 472, 53, 372, 540, 423.3, 423.8

[56] References Cited

U.S. PATENT DOCUMENTS

| | | | |
|---|---|---|---|
| 2,404,783 | 7/1946 | Blom | 103/87 |
| 2,423,436 | 7/1947 | Blom | 417/423.3 |
| 2,682,229 | 6/1954 | Luenberger | 103/87 |
| 3,164,102 | 1/1965 | Schmidt | 103/155 |
| 4,614,482 | 9/1986 | Gaffal | 417/373 |
| 4,932,848 | 6/1990 | Christensen | 417/414 |
| 4,947,491 | 8/1990 | Parkinson et al. | 4/321 |

*Primary Examiner*—Charles G. Freay
*Assistant Examiner*—Robert Z. Evora
*Attorney, Agent, or Firm*—J.C. Spadacene

[57] ABSTRACT

A pressure compensator for a sub-sea pumping system for pumping an effluent from a deep-sea wellhead comprising a topside module, a sub-sea module, and an umbilical connection between the topside and sub-sea modules. Hydraulic fluid is circulated through the sub-sea module for cooling and lubricating the motor and the pump. The hydraulic cooling and lubricating fluid is preferably a single hydraulic fluid that is compatible with the effluent being pumped. The hydraulic fluid is circulated through a submerged pressure compensator which may include a bellows assembly. The pressure compensator is responsive to the pressure of the effluent being pumped and pressurizes the hydraulic cooling and lubricating fluid to a pressure above the pressure of the effluent. The pressure compensator also responds when the volume of hydraulic cooling and lubricating fluid in the system is reduced or increased, such as by leakage or thermal expansion, in order to maintain the pressure of the hydraulic fluid.

29 Claims, 4 Drawing Sheets

SUB-SEA PUMPING SYSTEM AND ASSOCIATED METHOD INCLUDING PRESSURE COMPENSATING ARRANGEMENT FOR COOLING AND LUBRICATING

CROSS-REFERENCE TO RELATED APPLICATION

This application is a continuation-in-part of U.S. application Ser. No. 08/567,558 filed Dec. 5, 1995, now U.S. Pat. No. 5,795,135, which is incorporated herein by reference.

BACKGROUND OF THE INVENTION

1. Field of the Invention

The invention relates to a pumping system and an associated method for the pumping of an effluent from a sub-sea well where the effluent is transported to a floating surface platform or to an on shore site for processing. More particularly, the invention relates to a pressure compensator for a sub-sea pumping station for pumping a multiphase effluent and which is used in conjunction with a deep-sea well head.

2. Background Information

As shallow offshore oil and gas production well reservoirs are being depleted, more nations and/or companies are taking a greater interest in deep-sea offshore oil and gas reservoirs in which sub-sea multiphase pumping systems are used to extract and pump the oil and/or gas from these reservoirs.

A sub-sea multiphase pumping system transports a multiphase effluent, which generally consists of mixtures of oil, gas, and water, from a sub-sea pumping station over a long distance through a pipeline to a remotely located processing plant where the multiphase effluent is then separated into individual fluid components prior to further processing. This processing plant may be on a floating surface platform or may be on the land.

Worldwide, several different types of sub-sea multiphase pumping systems are currently being developed and each type of multiphase pumping system consists of the same basic components: a multiphase pump, a drive for the multiphase pump, a power supply system, a control system, a pressure maintenance system, and auxiliary lubricating and cooling circuits for the multiphase pump/drive unit. A sub-sea multiphase pumping system generally consists of one or more of these basic components which are mounted on a base and then lowered and installed onto sub-sea trees where they are connected to a deep-sea wellhead.

The types of pumps in use today in the multiphase pumping system are either a rotodynamic pump or a positive displacement pump as these types of pumps are generally able to handle more than one effluent phase. In the deeper sea depths, the latter type of pump is used in that it is less sensitive to density and, therefore, less sensitive to the pressure variations of the multiphase effluent being pumped. Nevertheless, the sub-sea multiphase pump is required to maintain or increase the production rate of the multiphase effluent regardless of whether the well pressure is high or low.

The drive for the multiphase pump may be a hydraulic turbine or a variable speed electric motor, the latter having been determined to be more power efficient, more flexible in operation, and less sensitive to its remoteness from the power source.

For a hydraulic turbine, either pressurized water or oil is used as a drive fluid. The system for the pressurized water or oil is located on the floating surface platform, and several conduit feed lines are connected from this pressurized system to the sub-sea unit. Additionally, a barrier fluid system, which is generally different than the process and turbine fluids, is provided for cooling and for lubricating the bearings in the multiphase pump/drive unit and for compensating for the varying pressures in the system. This barrier fluid is routed to the floating surface platform where it is cooled and then returned to the sub-sea unit, and is maintained from the topside platform at a pressure greater than that of the process fluid so that any leakage that occurs will be of the barrier fluid either into the sea or through the mechanical seals into the process fluid.

If pressurized water is used to drive the hydraulic turbine, then the shaft seals between the turbine and the multiphase pump can be eliminated allowing the water in the turbine to flow through the close-clearance axial gaps in the shafting between the turbine and the multiphase pump and into the production or process fluid which, as discussed above, is the multiphase effluent being pumped. In this application, the barrier fluid may also be water which circulates through the multiphase pump and through the turbine housing. Pressure compensation occurs in that the barrier fluid leakage from the turbine flows into the multiphase pump and into the process or production fluid in the pump and finally into the seawater. The barrier fluid in effect provides a backpressure to the lubricating side of the seals to insure that the leakage is into the process fluid or into the turbine fluid side of the seals.

If oil is used to drive the hydraulic turbine, then seals are used to separate the compartment for the turbine fluid from that of the multiphase effluent being pumped. Generally, oil is also used as the barrier fluid for cooling and lubricating the bearings in the multiphase pump/drive unit and for compensating for the varying pressures in the inlet of the multiphase pump. Even though the barrier fluid is compatible with both the fluid in the turbine and the multiphase effluent being pumped, one of the disadvantages of this system is that small amounts of oil tend to leak into the surrounding seawater thereby creating an environmental problem.

Even though the hydraulic turbine multiphase pumping systems are considered by some as being mechanically and hydraulically simple in design and simple to maintain, the topside facilities for these types of pumping systems are required to support extensive systems for the power source, the hydraulic source, and the barrier fluid system.

The problem with these facilities is that their power consumption increases dramatically with increased pressure drop as the umbilical feed lines lengthen. That is, as the sub-sea stations go deeper and are located farther from their floating surface platform, the hydraulic line losses for the hydraulically turbine driven multiphase pump increases. In general, the more removed the energy source is from the sub-sea station, the more complex the recirculating umbilical feed lines and, therefore, the more costly it is to provide this type of boosting system for extracting a multiphase effluent from the deep-sea well.

Some system designers have recognized that for deeper wells, submerged motors provide a more economical alternative to the hydraulic turbine drive. In one such system, an electro-submersible pump has its motor, and in some applications, a transformer located on the sub-sea station. The motor/pump unit can both be oil cooled, or the motor can be water cooled and the pump can be oil cooled. In the first system where the oil is the sole lubricating and cooling agent, the oil system also provides the pressurization of the system to prevent back leakage of fluid from the pumped fluid, and the oil is transported to an air cooled cooling unit on the floating surface platform. Even though this system is the simpler of the electrical driven systems, it still requires umbilical feed and return lines which recirculate the cooling medium to the cooling unit on the floating surface platform and back to the sub-sea station.

In the second system where the motor is water-cooled and the pump is oil-cooled, there is an oil cooling circuit for the multiphase pump bearings and seals, and a water-glycol circuit for the submerged electric motor bearings and seals. The shaft seal leakage from each lubricating circuit enters a chamber between the motor and pump which houses the coupling for the motor and pump. The oil and water-glycol mix is collected in a leak-off tank. The water-glycol and oil solutions are periodically pumped to the floating surface platform where they are separated and recycled back to their respective sub-sea supply tanks. Each of the supply tanks have a bladder-type diaphragm which communicates with the oil supply tank, which, in turn, is in communication with the pump suction and which, therefore, regulates the pressure in the other tanks, resulting in all three tank pressures being equalized to the pump suction pressure during all modes of operation of the system regardless of the external pressure and water depth. A sub-sea heat exchanger for the oil and a sub-sea heat exchanger for the water-glycol transfer their heat loads to the surrounding water, and auxiliary impellers attached to the main drive train circulate the two coolant fluids through the motor and the pump whenever the motor is running. The umbilical connections between the sub-sea station and the floating surface platform comprise a three-phase electrical feed, a makeup oil line to the oil supply tank, a makeup water-glycol line to the water-glycol supply tank, and a leak-off line to the oil/water-glycol separator unit resulting in an increase in the size of the umbilical connections and therefore, a complex design for this two fluid system.

In general, the current technologies which feature sub-sea motors employ wet winding motors whose windings are directly cooled by the hydraulic cooling circuit medium which generally is oil. A disadvantage of using a wet winding motor is that the direct contact of the windings with the coolant reduces the long-term reliability of the motor even though special insulating materials are being used. Failure of the motor results in a substantial loss of production and increased maintenance costs in that in order to resume operation, the sub-station must be removed and replaced.

For a deep-sea well there is a continuing interest in submerged electrical motor driven pumps for the pumping of an effluent, which may be a multiphase effluent. However, the present system designs are costly and complex, and require a great degree of maintenance and manned topside support for their operation.

There remains, therefore, a need in the art to simplify the design for a sub-sea single or multiphase pumping system, to decrease the costs involved in providing a sub-sea single or multiphase pumping system, and to provide a more technically superior and economically advantageous single or multiphase pumping system.

There is a further need to provide a sub-sea single or multiphase pumping system which is substantially maintenance-free, requiring very little or no human intervention for its operation, and which has an increased life expectancy compared to present-day systems.

There is also a need for a sub-sea pressure compensating system for use in conjunction with a sub-sea single or multiphase pumping system which remotely controls pressure levels of the system.

SUMMARY OF THE INVENTION

The present invention has met the above needs. The present invention provides a pressure compensator for a sub-sea pumping system which may be multiphase or single phase and an associated method. The system preferably employs a single medium fluid as a coolant and lubricator and comprises a canned electrical motor, a single or multiphase pump connected to the canned electrical motor, and a pressure compensator preferably located on a sub-sea module. The pressure compensator is preferably a bellows device which is responsive to the suction pump pressure and which keeps the single medium fluid travelling through the motor/pump unit for cooling and lubricating the bearings and seals in the motor/pump unit at a pressure generally greater than the suction pressure. A topside module on a floating surface platform has a power supply source and a single medium fluid source. A first umbilical connection consists of a set of three-phase leads and connects the power source to the electrical canned motor, and a second umbilical connection consists of an hydraulic line and connects the single medium fluid source to the casing of the canned electrical motor. The single medium fluid is compatible with the effluent being pumped from the deep-sea well and preferably is oil if the multiphase effluent being pumped is a multiphase mixture of oil, gas, and water.

The single medium fluid is preferably also used in the pressure compensator. The pressure compensator autonomously operates the pumping system under water by automatically adjusting the pressure of the single medium fluid circulating through the system to the suction pressure of the pump and maintains the pressure of the single medium fluid circulating through the system at an amount greater than the suction pressure of the pump.

It is, therefore, an object of the present invention to provide a pressure compensator for a sub-sea pumping system and associated method for the pumping of a effluent from a deep-sea well. The pumping system uses a single medium fluid which is pressurized above the pump inlet by the pressure compensator which maintains a completely filled hydraulic cooling and lubricating circuit within the motor and the pump unit. The system of the present invention employs a single medium fluid as a coolant, a lubricator, and as the fluid in the pressure compensator, and is compatible with the effluent being pumped.

It is a further object of the present invention to provide a pressure compensator for a sub-sea pumping system which is simple in design with a limited number of components. The pressure compensator is relatively inexpensive, compact and efficient, and operates unmanned and autonomously at any sea depth for an extended period of time.

It is another object of the present invention to maintain the pressure of a pump/motor casing while utilizing as little of the single medium fluid as possible.

It is still a further object of the present invention to provide a pressure compensator which employs an expandable bellows assembly.

These and other objects of the present invention will be fully understood and better appreciated from the following description of the invention on reference to the illustrations appended hereto.

DESCRIPTION OF THE PREFERRED EMBODIMENT

Figure 1:
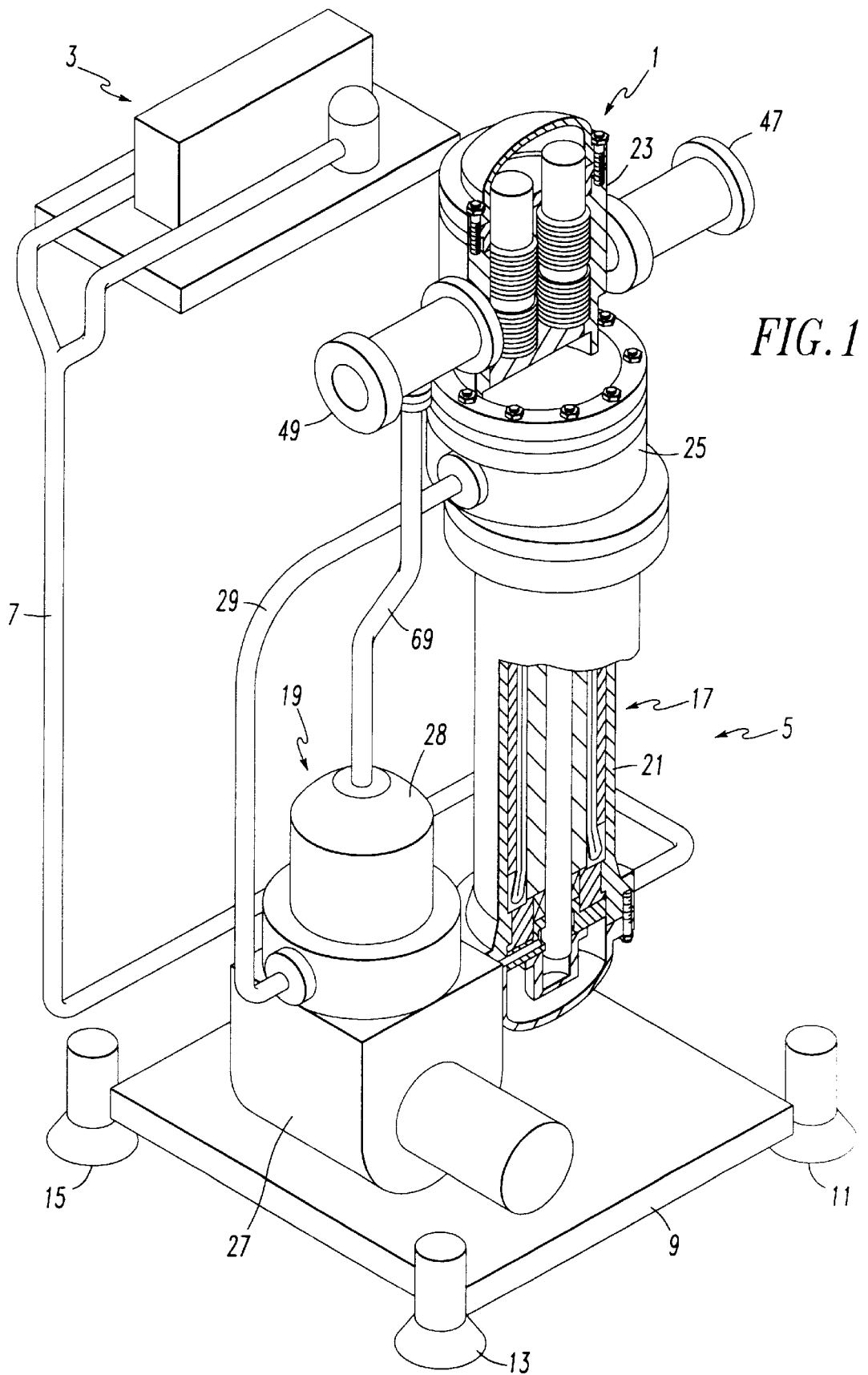
FIG. 1 is a perspective view illustrating a sub-sea pumping system of the present invention.

Referring to the figures, wherein like reference numerals designate like elements throughout the drawings, FIG. I illustrates a sub-sea pumping system 1 in accordance with the present invention which comprises a topside module generally indicated at 3 comprising a medium fluid makeup supply tank, a sub-sea module generally indicated at 5, and an umbilical connection, generally indicated at 7, which hydraulically and electrically connects the several components of the topside and sub-sea modules 3, 5, respectively. The topside module 3 may be supported on a floating surface platform (not shown) which may also support the production station. For the pumping system 1 of FIG. 1, the operating and maintenance personnel are generally located on shore or on a host platform, and the pumping system 1 is designed to operate in an unmanned mode.

The sub-sea module 5 has a mounting base 9 which is supported on a wellhead tree structure (not shown) which usually rests on the sea floor. The mounting base 9 may comprise any suitable support structure, such as several funnel-type guide posts, located at its corners, some of which are shown at numerals 11, 13, and 15, and which are used to align the sub-sea module 5 over the wellhead tree structure.

Still referring to FIG. 1, the mounting base 9 of the sub-sea module 5 supports units 17 and 19. Unit 17 houses a motor 21 and a multiphase pump 23 which are integrally connected by a transition housing 25, which provides a rigid pressure boundary between the motor 21 and the pump 23. A flexible shaft coupling is provided between the motor 21 shaft and the shaft of the pump 23. Unit 19 is hydraulically connected to the transition housing 25 by a hydraulic conduit 29. The umbilical feed line 7 hydraulically and electrically feeds from the topside module 3 to the motor 21 on the sub-sea module 5.

Figure 2:
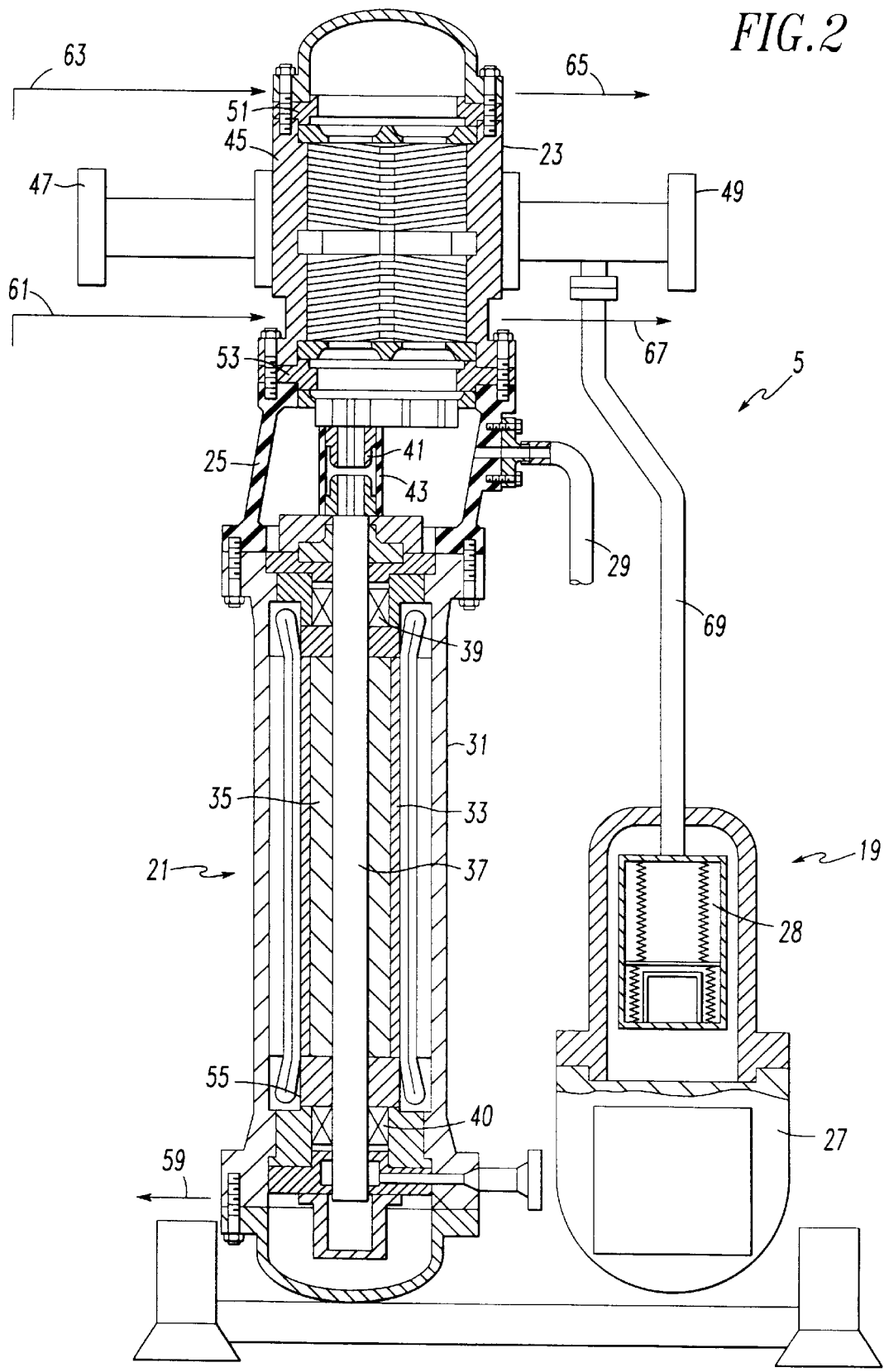
FIG. 2 is a schematic, cross-sectional view of the main components of the sub-sea module of FIG. 1.

Further details with regard to the several components of sub-sea module 5 are shown in FIG. 2. The unit 19 houses a heat exchanger 27 and a pressure compensator 28. The motor 21 is, preferably, an electrical variable speed motor with a high voltage that does not require a submerged transformer or step gear. This requirement is realized by a Westinghouse canned motor which is well-known in the art and which is further disclosed in U.S. Pat. Nos. 5,101,128, 5,185,545, 5,220,231 and 5,252,875. The motor 21 is chosen to operate in a speed range of 25% to 100% and provides a constant shaft output torque. The motor 21 basically is comprised of a housing 31, a stator can 33, a canned rotor 35 with a shaft 37, upper bearing arrangement 39 and lower bearing arrangement 40.

The shaft 37 of the motor 21 is mechanically connected to a shaft 41 of the multiphase pump 23 through a flexible coupling 43 inside the transition housing 25 which, in turn, is bolted between the housing 31 of the motor 21 and the housing 45 of the multiphase pump 23. The multiphase pump 23 is coupled to the motor 21 and is selected to be ideally suited for the transport of a multiphase effluent consisting of mixtures of oil, gas, and water. Conventional spur gears (not shown) may optionally be used to mechanically couple the motor 21 to the pump 23. The multiphase pump 23 may be a twin screw type pump, a helico-axial type pump, or any type of pump for pumping a multiphase effluent with oil and gas mixtures up to 95% GVF (gas volume fraction), or higher. The multiphase pump 23 has an upper shaft seal and bearing arrangement 51 and a lower shaft seal and bearing arrangement 53. The shaft seals separate the cooling/lubricating fluid from the process fluid at the pump. To improve reliability of the shaft seals, it is necessary to limit the differential pressure across the seals, maintain a positive differential pressure in a direction from the pump side to the process fluid side, and limit swings in the differential pressure to improve life and reduce oil consumption.

Still referring to FIG. 2, multiphase pump 23 is connected to a valve of a wellhead tree structure (not shown) supporting the mounting base 9 via a suction inlet 47 which draws the multiphase effluent being pumped out of the wellhead and discharges the pumped fluid through discharge outlet 49 from where the multiphase effluent is transported through a pipeline to a production station.

Referring to FIGS. 1 and 2, the hydraulic feedline 7 of FIG. 1 delivers medium fluid, preferably oil, into the base of the motor 21, whereby an auxiliary impeller (not shown) which is mounted on the shaft 37 of the motor 21 in a well-known manner circulates the hydraulic fluid into a lower bearing arrangement 40 between the canned stator 33 and the canned rotor 35, through the upper bearing arrangement 39 for their cooling and lubrication, and into the transition housing 25 from where the hydraulic fluid is then conveyed by the conduit 29 into the unit 19 housing the heat exchanger 27 and pressure compensator 28. The term "medium fluid" as used herein means the fluid that is supplied to the motor 21 and pump 23 for cooling and lubricating the motor and pump. While the medium fluid is being pumped through the motor 21, it is also being delivered into the seal and bearing arrangements 51 and 53 of the multiphase pump 23.

In the unit 19, the medium fluid is cooled by the heat exchanger 27. The pressure compensator 28 is used to maintain the internal pressure in pumping system 1, as more fully discussed below. Medium fluid is preferably only pumped through the motor 21 and the multiphase pump 23 when the motor 21 is being operated since the auxiliary impellers (not shown) are mounted on the motor shaft 37, thereby eliminating the need for separate power sources.

The present invention preferably uses a single medium fluid, such as oil as the medium fluid for lubricating and cooling the motor core and bearing arrangements 35, 39, 40 and 51, 53 of the motor 21 and the pump 23, respectively. since it is compatible with the multiphase effluent being pumped in that the multiphase effluent consists of an oil mixture. Any fluid leakage through the seals of the seal and bearing arrangements 51 and 53 during the cooling and lubricating process will flow into the multiphase pump 23, avoiding contamination of the subsea environment with the fluid medium. This eliminates the need for a separate leak-off hydraulic circuit or for separators which are required for pumping systems which employ combinations of water, water-glycol, oil and gas systems for cooling, lubricating, and pressure control.

Still referring to FIG. 2, the medium fluid from the internal hydraulic circuits of the pump 23 and the motor 21 circulates through the heat exchanger 27 which transfers the heat load in the medium fluid generated by the motor 21 and the pump 23 into the surrounding sea water. The heat exchanger 27 may be a single or multiple tube type using convective heat transfer to the surrounding sea water to remove waste heat and eliminate the need to circulate the media fluid to a cooler on the top side platform.

Figure 3:
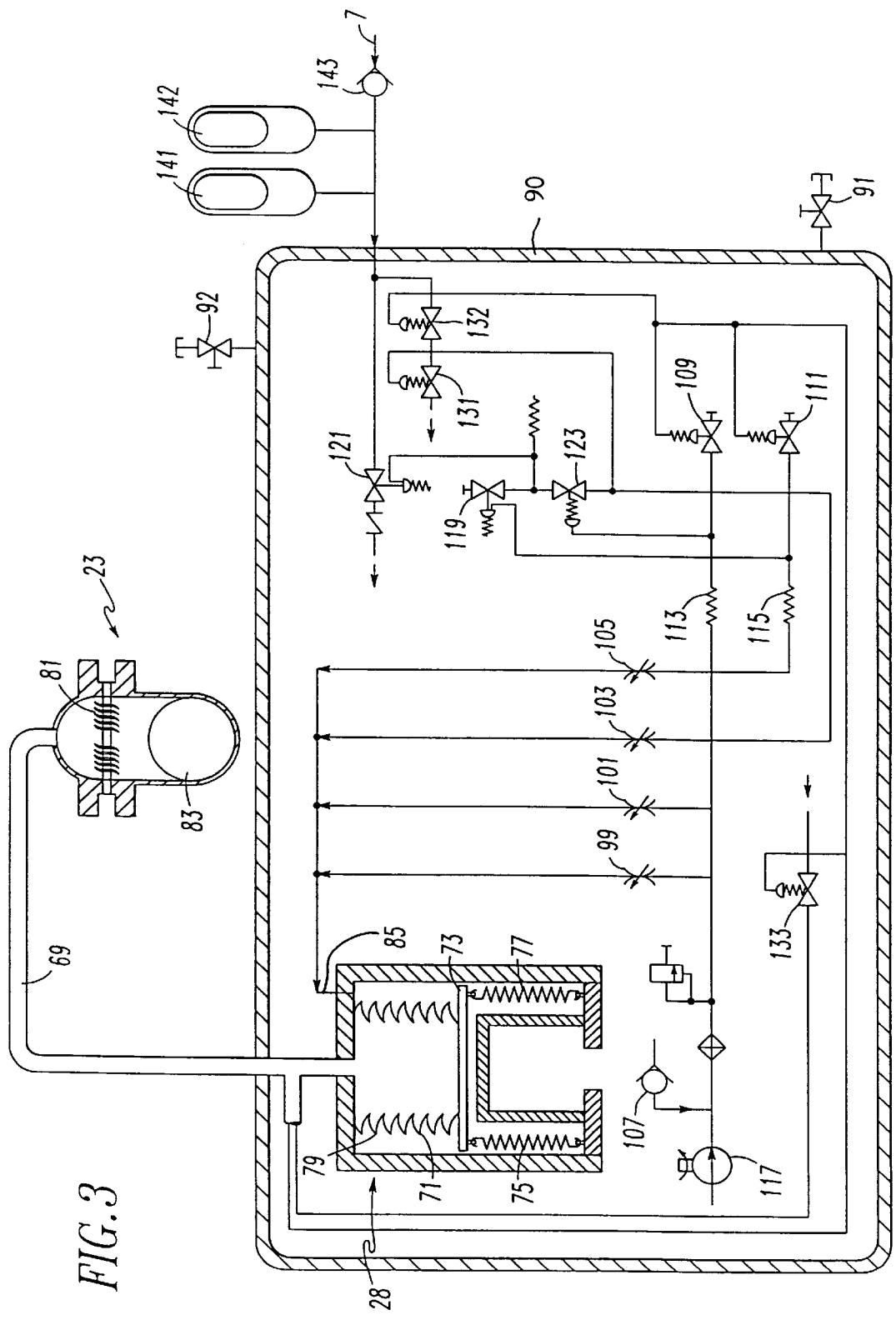
FIG. 3 is a schematic diagram showing a part of the hydraulic circuit for the hydraulic fluid between the pump and the pressure compensator for the sub-sea module of FIG. 1.

Referring now to FIG. 3, the unit 19 includes a pressure compensator 28 which is connected to the pump 23 through a suction pressure sense line 69. A pressure boundary 90 including the pump 23, motor 21 and transition piece 25, as schematically shown in FIG. 3, contains the medium fluid for cooling and lubricating the seal and bearing arrangement of the motor and pump, and isolates the medium fluid from the surrounding sea water. A lower fill valve 91 is provided for filling the interior of the pressure boundary 90 with the medium fluid, while an upper vent valve 92 permits connection of a vacuum system used to initially evacuate the system. The vacuum fill assures that the system is oil solid, maximizing the operation and dynamic response of the pressure compensator. Preferably, the pressure compensator 28 comprises a bellows assembly schematically indicated at numeral 71. The bellows assembly 71 may comprise a welded stainless steel diaphragm 73, springs 75 and 77, and a plurality of leaves, one of which is indicated at numeral 79. The tension springs 75 and 77 are connected to the diaphragm 73, and are preferably designed such that bellows assembly 71 is able to displace at least two gallons per fill cycle of the medium fluid between the pump suction 69 and the pressure boundary 90. The leaves 79 may be connected to the diaphragm 73 on a side opposite to the tension springs 75 and 77. The leaves form a seal between the pressure boundary 90 and the pump suction 69.

Preferably, the leaves 79 are of alternating thick and thin material, are welded together, and are made of corrosion resistant metal. The thin material provides for good axial compliance and flexibility of the bellows assembly 71, while the thick material provides a degree of stiffness to resist collapse of the bellows assembly 71 from the higher pressure in the pump motor pressure boundary 90. Alternatively, leaves of equal thickness with circumferential corrugations can be utilized.

Still referring to FIG. 3, the suction pressure line 69 communicates to the bellows assembly 71 the pressure of the multiphase effluent at the suction of the pump 49. The spring load maintained by the inventory control system 109, 111, 113, 115, 117, 119, 121, 123, 131 and 132 sums with the pump suction pressure acting over the bellows area to assure a positive differential pressure across each of the pump shaft seals 51 and 53. The suction pressure sense line 69 communicates any changes which occur in the static pressure of the multiphase effluent being pumped in the sub-sea module 5 of FIG. 1 substantially without attenuation to the bellows assembly 71, that is, without loss of pressure in the bellows assembly 71. Where the internal side of the bellows assembly 71 is exposed to the pump suction pressure, the external side of the bellows assembly 71, as indicated at numeral 85, is open to the pressure in the motor 21 and the pump 23, and adjusts the internal pressure of the medium fluid in the system for cooling and lubricating the seals and bearing arrangements 39, 40 and 51, 53 of the motor 21 and the pump 23, respectively, to the pump suction pressure in a manner which will be discussed hereinbelow.

The pressure compensator 28, preferably, is located as close as possible to the pump 23 so that the hydraulic connections 65, 67 (FIG. 2) to the shaft seal and bearing arrangements 51 and 53 are relatively short in order to improve the response of the motor pump side pressure of the bellows assembly 71 to the transient changes in the pump suction side of the assembly 71.

The bellows assembly 71 acting as a pressure compensator permits the springs 75 and 77 to load the compensator such as to provide a positive pressure in the pump 23 which is greater than the wellhead pressure. This differential pressure, where pressure of the pump pressure boundary is greater than the wellhead pressure, may be referred to as the "seal bias pressure." Preferably, the differential pressure is held substantially constant at a level of from 0 to about 100 psi, and more preferably from about 35 to about 75 psi. The stiffness of the springs 75 and 77 combined with the displacement of the bellows 71 allows for the development of a system for supplying medium fluid from a top-side makeup hydraulic supply tank in the topside module 3 to the motor 21 and the pump 23 of the sub-sea module 5 based on changes in the seal pressure bias. When the medium fluid in the motor 21 and the pump 23 is low relative to a preset limit, the suction pressure in the sense line 69 causes the bellows assembly 71 to be extended and the springs 75 and 77 to be compressed or relaxed wherein the seal pressure bias becomes slack or low. This low seal pressure bias is used in the system to signal the hydraulic system, through a system of valves (FIG. 3) to begin to deliver medium fluid to the seal and bearing arrangements 39, 40 and 51, 53 of the motor 21 and the pump 23, respectively, until the preset full limit for the medium fluid in the sub-sea module 5 is reached. As the motor 21 and the pump 23 are being filled to this preset limit for the medium fluid from a top-side supply tank, the bellows assembly 71 becomes more compressed and the springs 75 and 77 are stretched, or compressed if compression springs are used. As the springs 75 and 77 stretch or compress, the pressure in the motor 21 and the pump 23 rises and the medium fluid continues to be delivered until the pressure in the motor 21 and the pump 23 reaches a set point pressure above the pump suction pressure. The bias pressure increase resulting from the stretching or compressing of the springs 75 and 77 is sensed in the hydraulic system and is used as a signal to interrupt the flow of medium fluid from the makeup supply tank to the unit 17 containing the motor 21 and the pump 23.

Referring again to FIG. 3, there is shown a schematic of the hydraulic system for the medium fluid for lubricating and cooling the seal and bearing arrangements 51 and 53 of the pump 23 of FIG. 2. Valves for these hydraulic connections are indicated at numerals 99, 101, 103 and 105 in FIG. 3. These valves control the flow of lubricating and cooling fluid to the seals and bearings, and may also control fluid flow to the pump timing gears.

The hydraulic system of FIG. 3 utilizes a pair of pressure regulating valves 109 and 111 in conjunction with orifices 113, 115 to form a pair of pressure sensing relays. Each of the valves 109 and 111 is equipped with a sensing piston that is referenced on its one side to the pump suction pressure, and on its opposite side to the pump/motor internal pressure. Consequently each valve 109 and 111 references the differential pressure between the medium fluid in the motor 21 and the pump 23 and the pump suction pressure. Each valve 109 and 111 has a range spring set to establish a setpoint. The valves 109 and 111 have the characteristic that they are open at pressures below their set points and closed above these set points. Since they are referenced to the suction pressure, these setpoint pressures are above the pump suction pressure.

The valves 109 and 111 are in series with the orifices 113 and 115, respectively. When each of the valves 109 and 111 is closed, there is essentially no fluid flow, and the pressure down stream of each of the orifices 113 and 115 is equal to the pressure at the discharge of a hydraulic pump assembly 117 (e.g., 400–600 psig higher than the pressure of the medium fluid in the motor 21 and the pump 23). The hydraulic pump assembly 117, which includes a filter and conventional relief valves, may be driven by the motor shaft 37 or by the pump shaft 41. When each of the valves 109 and 111 opens, flow through the orifices 113 and 115 decreases the pressure downstream of each orifice to essentially the pressure of the fluid in the motor 21 and the pump 23. The valves 119 and 121 are normally closed valves which require a pressure higher than the pressure of the medium fluid in the motor 21 and the pump 23 when applied to their diaphragm or piston for their opening. Likewise, the valve 123 is a normally open valve requiring a pressure higher than the pressure of the medium fluid in the motor 21 and the pump 23 for its closing. When the pump 117 is operated by the main motor 21 there is a high pressure to the inlet to the valve 123 and to each of the orifices 113 and 115. If the pressure of the medium fluid in the motor 21 and the pump 23 is below 30 psig above pump suction pressure, then the valve 109 will be open, and there will be no pressure on the operator (piston or diaphragm) of the valve 123. The pressure of the medium fluid in the motor 21 and the pump 23 will also be below the setpoint of the valve 111, and the valve 111 will be open. In this case there is a pressure drop across the orifice 115. The consequence of low pressure between the orifice 115 and the valve 109 is that the operator of the valve 119 is not pressurized. The valve 119, which is normally closed, permits the operator supply line to the valve 121 to be pressurized. High pressure from the pump 117 through the valve 123 pressurizes the operator (piston or diaphragm) of the valve 121. The valve 121 thus opens and medium fluid flows from the umbilical supply line 7. The umbilical line 7 is pressurized to assure that there is sufficient pressure for medium fluid to flow into the motor 21 and the pump 23.

As medium fluid flows into the motor 21 and the pump 23, the bellows assembly 71 is compressed. The action of compressing the bellows assembly 71 stretches the bias springs 75 and 77, or compresses the compression springs, and the pressure of the medium fluid in the motor 21 and the pump 23 rises relative to the suction pump pressure. As the pressure of the medium fluid in the motor 21 and the pump 23 rises above the setpoint of the valve 109, the valve 109 closes. Closing of the valve 109 shuts off the flow through the orifice 113 and the valve 123 closes. When the valve 123 closes, pressure is trapped in the operator of the valve 121 and medium fluid continues to flow from the umbilical line 7 into the motor 21 and the pump 23.

The medium fluid continues to flow into the motor 21 and the pump 23 until the pressure exceeds the setpoint of the valve 111. At that point the valve 111 closes and the flow through the orifice 115 stops. The pressure down stream of the orifice 115 rises to the level of the output of the pump 117. The valve 119, connected to the downstream side of the orifice 115, opens. This vents the pressure from the valve 121 and permits it to close, stopping the supply flow of medium fluid down the umbilical line 7.

The bellows pressure compensator 71 maintains the seal pressure bias while the pump is in operation, without the need to discharge or acquire fluid media to maintain the pump/motor pressure 21, 23 and 23 above the pump suction pressure. Fluid media is only acquired from the subsea umbilical 7, during steady state operation to replace losses through the pump shaft seals 51 and 53. Additional means may be provided to accommodate changes in the fluid media inventory during deployment, standby, startup and shutdown of the system.

During deployment, the pump suction 47 undergoes pressure changes (increases) from atmospheric pressure to a pressure equal to the deployment depth. e.g., about 1,500 psig at 1,000 meters. Additionally, the fluid medium is cooled from ambient surface temperature of about 100° F. to the subsea temperature, typically about 35–38° F. The combined increase in pressure and decrease in temperature may shrink the fluid medium about 5 times the displacement of the bellows.

During start-up, the fluid medium is heated from the subsea temperature to a nominal operating temperature, sufficiently high to reduce viscosity and consequently fluid and friction losses but low enough to extract heat from the motor without exceeding the insulation temperature rating, typically about 150° F. Concurrent with the heat-up of the fluid medium, the wellhead pressure is reduced as fluid flow results in pressure losses in the supply piping. The resulting swell of the fluid medium is typically about 6 times the displacement of the bellows.

During shutdown from normal operation, the fluid medium temperature may drop from about 150° F. to about 35–38° F. With flow shutdown, the well head pressure rises to its normal static pressure of about 1,500 psig. The net result is shrinkage in the fluid medium equivalent to about 6 times the bellows displacement.

During standby with the pump off, the seals continue to leak into the pump suction. With the pump stopped and with a low differential pressure from the pump/motor casing to the pump suction, the leakage is reduced. However, a positive differential is maintained to assure that foreign material from the wellhead does not get into the pump.

As shown in FIG. 3, a check valve 107 permits reverse rotation of the motor on shutdown. Accumulators 141 and 142 are installed on the top side oil line 7 to provide pressure for the deployment phase of operation. A check valve 143 is installed on the top side oil line 7 to avoid depressurizing the accumulators if the umbilical pressure is unavailable.

The pressure and inventory control system has different modes for pump off and pump on. When the system is on, valve 131 is pressurized to the closed position by pressure from the hydraulic system pump 117. When the pump 117 is on, there is pressure available to operate valves 109, 111, 113, 115, 119, 121 and 123, and valve 132 is isolated. Therefore, pressure control is accomplished by the bellows 71 and inventory management is accomplished by valves 109, 111, 113, 115, 121 and 123. When the system is off, the pump 117 is off and valve 131 (normally opened) is opened. Valves 109, 111, 113, 115, 119, 121 and 123 are all idle with pump 117 off. Opening valve 131 permits the pressure regulating valve 132 to add oil from the umbilical 7. This regulator is referenced to the pump suction and is ideally set low, e.g., about 20 bar, compared with the normal operating pressure range to economize on oil consumption when the system is on standby. The pressure regulating valve in conjunction with the precharged accumulators permits the maintenance of fluid medium pressure during deployment. This regulator also adds fluid media to maintain seal pressure bias, when the system inventory shrinks during each shutdown upon cool down. The accumulators provide short term backup to the top side oil supply system 3, and also improve the fluid medium transfer rate for fills by storing high pressure fluid locally rather than relying on it to be transported down the length of the umbilical 7.

The system is equipped with a differential pressure relief valve 133. This back pressure control valve, typically set for about 100 psig, vents fluid medium to the pump suction whenever the system inventory swells due to heat-up during system start-up.

As the system operates, medium fluid leakage through the seal and bearing arrangements 39, 40 and 51, 53, respectively, of the motor 21 and the pump 23 will flow into the multiphase effluent being pumped in the pump 23, resulting in the pressure in the motor 21 and the pump 23 dropping, the bellows assembly 71 expanding, and the springs 75 and 77 contracting. Since the extension of the springs 75 and 77 is reduced, the pressure of the medium fluid in the motor 21 and the pump 23 decreases relative to the pump suction pressure. When the pressure in the motor 21 and the pump 23 drops below the minimum setting, which generally will be above the suction pump pressure, the hydraulic system of FIG. 3 begins the cycle again, whereby the medium fluid is delivered from makeup supply tank to the pressure boundary 90. The media fluid is delivered to the casing of the pump and motor, where it mixes with the general inventory of fluid, which lubricates elements 39, 40, 51 and 53 and cools the motor 35. The valve 133 in the hydraulic system of FIG. 3 avoids overpressurization and premature wear of the seals of the seal arrangements 51 and 53 of the pump 23.

Assuming continuous operation of the system 1 of FIG. 1, it is expected that medium fluid from the makeup supply tank to sub-sea module 5 may be lost at an estimated rate of about 4 gallons per day. The topside module 3, through the hydraulic system, is expected to deliver about 2 gallons of medium fluid to the sub-sea module 5 about twice per day, with the makeup supply tank being refilled by an operator about three times a year. It is important to appreciate that the medium fluid from the makeup supply tank leaks into the process fluid and is reclaimed, and that the leakage does not occur into the environment.

Figure 4:
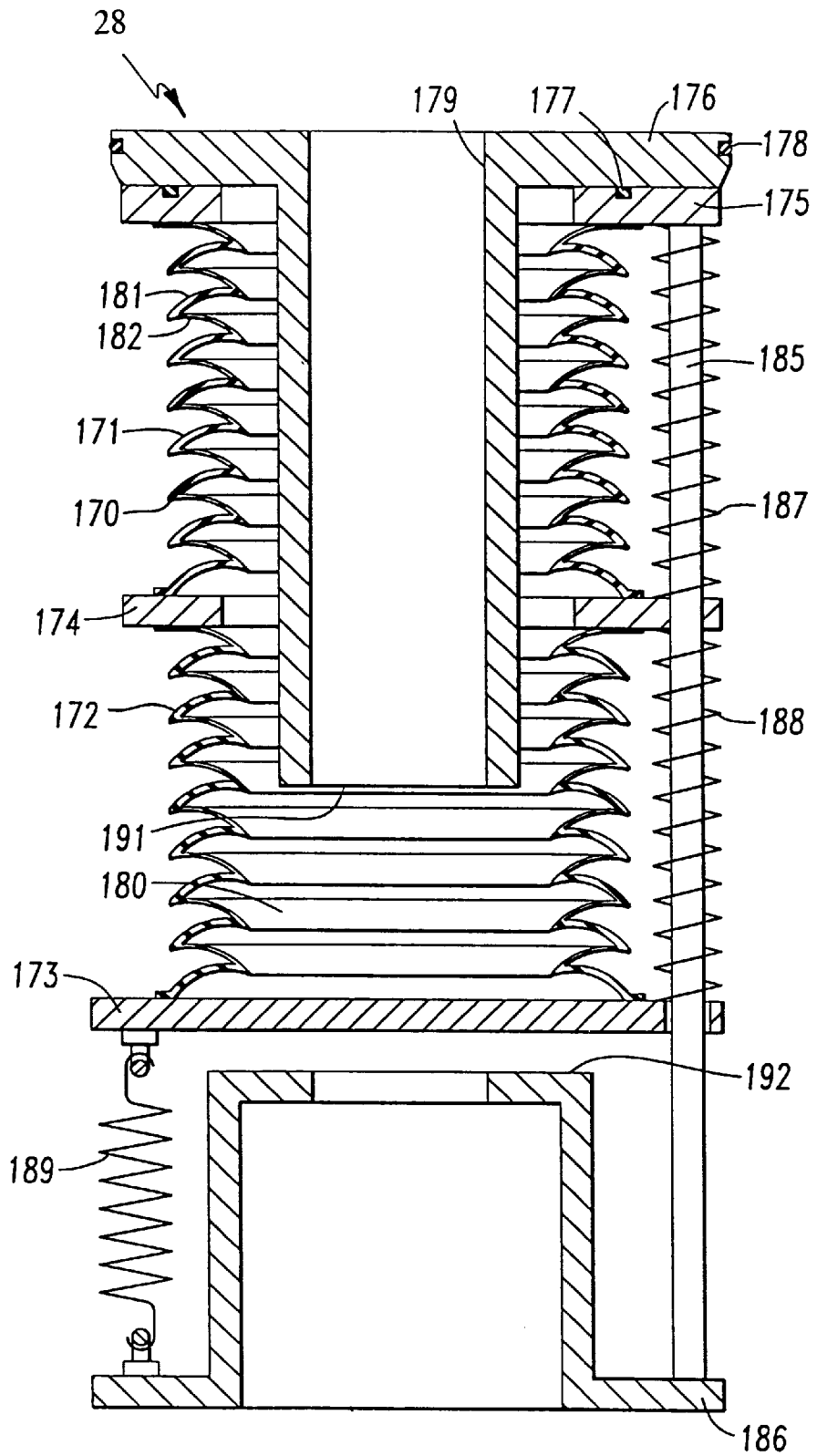
FIG. 4 is a partially schematic, side cross-sectional view of a bellows pressure compensator in accordance with a preferred embodiment of the present invention.

FIG. 4 illustrates a pressure compensator 28 in accordance with a preferred embodiment of the present invention. In this embodiment, the pressure compensator 28 includes a variable volume container 170 comprising bellows 171 and 172 which are axially aligned with each other. The bellows 172 is sealed at one end to a rigid diaphragm 173 by any suitable means such as welding. The bellows 171 and 172 are connected to each other by a middle support ring 174 which may be welded to the bellows 171 and 172. The upper portion of the bellows 171 is connected to an end support ring 175, which is connected to a flange 176. The end support ring 175 is sealed to the flange 176 by means of a seal 177. Another seal 178 is used to seal the flange 176 to the housing of the pressure compensator unit, i.e., unit 19 shown in FIG. 2. The flange 176 includes an effluent inlet 179 which is in fluid communication with the effluent well fluid pumped from the wellhead via the suction pressure sense line 69, as shown in FIGS. 1–3. During operation, the variable wellhead effluent pressure is communicated to the interior volume of the bellows 171 and 172 by means of the effluent inlet 179. In a preferred embodiment, the interior surfaces of the bellows 171 and 172, as well as other surfaces that contact the effluent, are coated with a material such as polytetrafluoroethylene which prevents sticking of the effluent during operation of the pressure compensator.

In accordance with a preferred embodiment, each of the bellows 171 and 172 comprises a series of thick leaves, one of which is shown as element 181 in FIG. 4, alternating with a series of thin leaves, one of which is shown as element 182. As discussed previously, the thick leaves 181 provide a degree of stiffness to resist collapse of the bellows, while the thin leaves 182 provide for good axial compliance and flexibility of the bellows. While the bellows leaves 181 and 182 shown in FIG. 4 are curved, other configurations such as straight leaves or highly contoured leaves can be used. While two axially aligned bellows 171 and 172 are shown in FIG. 4, it is to be understood that a single bellows could be used in accordance with the present invention, in which case the middle support ring 174 could be eliminated. In addition, it is possible to include more than two bellows in accordance with the present invention. For example, three or more axially aligned bellows could be used. As with the previously described embodiments, the bellows 171 and 172 are preferably made of corrosion resistant metal leaves that are welded together. Likewise, the diaphragm 173 is preferably made of corrosion resistant metal. The bellows 171 and 172 are preferably able to displace at least two gallons of the medium fluid which cools and lubricates the motor and pump assemblies.

At least one rod 185 is preferably located externally adjacent to the bellows 171 and 172, and is connected at one end to the end support ring 175 and at another end to a base 186. In the embodiment shown in FIG. 4, the rod 185 provides lateral support for the bellows 171 and 172. The diaphragm 173 and the middle support ring 174 are slidably engaged on the rod 185, preferably by friction-reducing bushings (not shown). While a single rod 185 is shown in FIG. 4, additional rods could be provided around the circumference of the bellows 171 and 172, if desired.

Compression springs 187 and 188 are mounted on the rod 185, and act to mechanically bias the diaphragm 173 downward in FIG. 4. The upper compression spring 187 presses against the end support ring 175 at one end and against the middle support ring 174 at the other end. The lower compression spring 188 presses against the middle support ring 174 at one end and against the diaphragm 173 at the other end. A tension spring 189 may be connected at one end to the diaphragm 173 and at the other end to the base 186. The compression springs 187 and 188, in combination with the tension spring 189, provide a mechanical bias which forces the bellows 171 and 172 to extend in the axial direction. While a combination of compression and tension springs is shown in FIG. 4, axial biasing of the bellows 171 and 172 could be accomplished using only compression springs or tension springs. In addition, a single spring or multiple springs could be used to achieve the biasing effect. For example, while axially aligned compression springs 187 and 188 are shown in FIG. 4, other compression springs could be disposed at other locations outside or inside the bellows 171 and 172. Furthermore, while a single tension spring 189 is shown in FIG. 4, additional tension springs could be used at other locations. In addition to the compression and tension springs shown in FIG. 4, other means for mechanically biasing the bellows in the axial direction can be used. For example, leaf springs or bellville springs may be used. In addition, compliant or elastic materials may be used to mechanically bias the bellows.

As shown in FIG. 4, a high pressure mechanical stop 191 is provided as part of the flange 176. The mechanical stop 191, which is disposed inside the bellows 171 and 172, limits the axial movement of the bellows 171 and 172 by contacting the diaphragm 173 once the pressure outside of the bellows 171 and 172 reaches a predetermined upper limit, e.g. 80 psi. Alternatively, the high pressure mechanical stop could be provided outside of the bellows 171 and 172. A low pressure mechanical stop 192 is provided as part of the base 186. The low pressure mechanical stop 192 limits the axial extension of the bellows 171 and 172 by contacting the diaphragm 173 once the pressure outside of the bellows 171 and 172 reaches a predetermined lower limit, e.g., 30 psi.

Any changes which may occur in the static pressure of the suction pressure of the fluid being pumped in the sub-sea module 5 of FIG. 2 are communicated substantially without attenuation to the interior volume 180 of the bellows 171 and 172 via the suction pressure sense line 69 and effluent inlet 179 Thus, where the internal volume 180 of the bellows 171 and 172 is subjected to the pump suction pressure, the external side of the bellows 171 and 172 is subjected to the pressure of the medium fluid in the motor 21 and the pump 23, and adjusts the pressure of the medium fluid to a level above the pump suction pressure of the effluent. The bellows 171 and 172, which are biased by the compression springs 187 and 188 and tension spring 189, provide a positive pressure to the medium fluid of the pump and motor which is greater than the well head pressure of the effluent. A differential pressure or seal pressure bias is therefore provided for the sub-sea pumping system. In accordance with a preferred embodiment, the differential pressure is held substantially constant at a level of about 35 psi to about 75 psi.

As with the previously described embodiments, the embodiment shown in FIG. 4 permits the supply of medium fluid from a top-side makeup hydraulic supply tank to the motor 21 and the pump 23 of the sub-sea module 5 based on changes in the seal pressure bias. When the medium fluid in the motor 21 and the pump 23 is low relative to a preset limit, the suction pressure in the sense line 69 and the force of the springs 187, 188 and 189 cause the bellows 171 and 172 to be extended. This low seal pressure bias is used to signal the hydraulic system, through a system of valves as previously described, to deliver makeup medium fluid to the motor 21 and the pump 23 until the preset limit for the medium fluid in the sub-sea module 5 is reached. As the motor 21 and the pump 23 are being filled to the preset limit for the medium fluid from the top-side supply tank, the bellows 171 and 172 are axially compressed, the compression springs 187 and 188 are compressed, and the tension spring 189 is stretched. The pressure in the motor 21 and the pump 23 rises and the medium fluid continues to be delivered until the pressure in the motor 21 and the pump 23 reaches a setpoint pressure above the pump suction pressure. Once the setpoint pressure is reached, the flow of the medium fluid from the makeup supply tank to the unit 17 containing the motor 21 and the pump 23 is interrupted.

In accordance with the embodiment shown in FIG. 4, the total displacement of the bellows 171 and 172 is preferably about two gallons. Thus, the variable volume container 170 preferably expands or contracts to displace about two gallons of the medium fluid. However, smaller or larger displacements may be used. The bellows assembly preferably cycles between a maximum external pressure of about 80 psi and a minimum external pressure of about 30 psi. The bellows assembly is preferably capable of withstanding a leak test pressure of 150 psi from the exterior to the interior of the bellows. The high pressure mechanical stop 191 is preferably capable of supporting a pressure of 150 psi without failure. The bellows assembly is also preferably capable of withstanding a leak test pressure of 15 psi from the interior to the exterior of the bellows. The low pressure mechanical stop 192 is preferably capable of withstanding a vacuum of 15 psi applied to the exterior of the bellows without failure. The external dimensions of the pressure compensator 28 shown in FIG. 4 may be varied depending on the particular application. In many applications, the overall diameter of the pressure compensator 28 is typically 15 inches or less, while the axial length of the pressure compensator may be adjusted as required.

While the pressure compensator of the present invention preferably comprises a bellows assembly as shown in FIGS. 3 and 4, it is to be understood that other types of variable volume pressure compensator assemblies may be used in accordance with the present invention. For example, instead of providing the interior of the bellows in flow communication with the effluent, the exterior of the bellows may communicate with the effluent, in which case the interior of the bellows contains the medium fluid. In this embodiment, the biasing means are used to compress the bellows rather than expand the bellows. As a further example, a spring-biased piston having an expandable chamber in flow communication with the effluent being pumped may be used in place of the bellows assembly. In this embodiment, the interior of the piston chamber may be lined with a flexible bladder which prevents contact between the effluent being pumped and the piston ring seals.

In accordance with the present invention, monitoring of the operation of the system may be performed from a production platform control room. The power levels for the motor 21 and the head and flow of the multiphase effluent being pumped will be monitored during the pumping production process. The ambient water temperatures will be sufficient to provide adequate cooling of the components of the sub-sea module 5.

The sub-sea multi-phase system of the present invention is a hydraulically solid pumping system in that it is a completely filled or closed hydraulic system (no gas pressurization). The system preferably uses a single medium fluid which is pressurized above the pump inlet pressure by the pressure compensator 28, which maintains a completely filled hydraulic cooling and lubricating circuit within the motor 21 and the pump 23.

It is to be appreciated that even though the invention has been addressed herein to a multiphase effluent pumping system, it can be used in a single phase effluent pumping system.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A sub-sea pumping system for pumping a well fluid from a seabed well comprising:

a motor and pump unit contained in a housing for pumping said well fluid at a variable pressure;

means for delivering a medium fluid into said motor and pump unit for cooling and lubricating said motor and pump unit; and pressure compensator means outside the housing of the motor and pump unit responsive to said well fluid pressure for conveying said medium fluid through said motor and pump unit at a differential pressure above said well fluid pressure.

2. The sub-sea pumping system of claim 1, wherein said pressure compensator means comprises means for pressurizing said medium fluid to a substantially constant differential pressure.

3. The sub-sea pumping system of claim 1, wherein said means for delivering said medium fluid into said motor and pump unit comprises means for providing makeup medium fluid to said motor and pump unit when said pressure of said medium fluid reaches a predetermined lower limit.

4. The sub-sea pumping system of claim 1, wherein said pressure compensator means comprises an expandable container having an interior volume in communication with said well fluid, an exterior surface in communication with said medium fluid, and a biasing means for forcing said exterior surface of said expandable container against said medium fluid to pressurize said medium fluid.

5. The sub-sea pumping system of claim 4, wherein said expandable container comprises at least one bellows.

6. The sub-sea pumping system of claim 5, wherein said expandable container comprises a plurality of substantially axially aligned bellows.

7. The sub-sea pumping system of claim 5, wherein said at least one bellows is expandable in an axial direction and said pressure compensator comprises means for preventing substantial lateral movement of said bellows in a direction perpendicular to said axial direction.

8. The sub-sea pumping system of claim 7, wherein said means for substantially preventing lateral movement of said bellows comprises at least one rod disposed externally adjacent to said bellows and extending substantially in said axial direction.

9. The sub-sea pumping system of claim 8, wherein said at least one rod slidingly supports said biasing means.

10. The sub-sea pumping system of claim 9, wherein said biasing means comprises at least one compression spring.

11. The sub-sea pumping system of claim 5, wherein said pressure compensator comprises at least one mechanical stop means for limiting axial movement of said at least one bellows.

12. The sub-sea pumping system of claim 11, wherein said at least one mechanical stop means is disposed inside said at least one bellows and prevents axial movement of said bellows once the pressure of said medium fluid reaches a predetermined upper limit.

13. The sub-sea pumping system of claim 11, wherein said at least one mechanical stop means is disposed outside said at least one bellows and prevents axial movement of said bellows once the pressure of said medium fluid reaches a predetermined lower limit.

14. The sub-sea pumping system of claim 4, wherein said biasing means comprises a plurality of springs selected from the group consisting of compression springs, tension springs, and combinations thereof.

15. The sub-sea pumping system of claim 4, wherein said pressure compensator means comprises means for expanding said expandable container when the volume of said medium fluid is reduced.

16. The sub-sea pumping system of claim 15, wherein said means for delivering said medium fluid into said motor and pump unit comprises means for providing makeup medium fluid to said motor and pump unit when the volume of said medium fluid is reduced and the pressure of said medium fluid reaches a predetermined lower limit.

17. A pressure compensator for a sub-sea pumping system for pumping a well fluid from a sea-bed well, said pressure compensator comprising:

a variable volume container having an interior volume in fluid communication with the well fluid pumped from a sea-bed well at a varying pressure and an exterior surface sealed from said interior volume in fluid communication with a cooling and lubricating medium fluid of a motor and pump unit of said sub-sea pumping system, wherein said variable volume container comprises an expandable container including a plurality of substantially axially aligned bellows defining said interior volume for communicating with said well fluid and said exterior surface for communicating with said medium fluid; and means for mechanically biasing said variable volume container against said medium fluid to pressurize said medium fluid at a differential pressure above the pressure of said well fluid.

18. The pressure compensator of claim 17, further comprising means for pressurizing said medium fluid to a substantially constant differential pressure.

19. The pressure compensator of claim 17, wherein said biasing means comprises means for forcing said exterior surface of said expandable container against said medium fluid to pressurize said medium fluid.

20. The pressure compensator of claim 17, wherein said at least one bellows is expandable in an axial direction and said pressure compensator comprises means for preventing substanital lateral movement of said bellows in a direction perpendicular to said axial direction.

21. The pressure compensator of claim 20, wherein said means for preventing substantial lateral movement of said bellows comprises at least one rod disposed externally adjacent to said bellows and extending substantially in said axial direction.

22. The pressure compensator of claim 21, wherein said at least one rod supports said biasing means.

23. The pressure compensator of claim 22, wherein said biasing means comprises at least one compression spring.

24. The pressure compensator of claim 17, wherein said pressure compensator comprises at least one mechanical stop means for limiting axial movement of said at least one bellows.

25. The pressure compensator of claim 24, wherein said at least one mechanical stop means is disposed inside said at least one bellows and prevents axial movement of said bellows once the pressure of said medium fluid reaches a predetermined upper limit.

26. The pressure compensator of claim 24, wherein said at least one mechanical stop means is disposed outside said at least one bellows and prevents axial movement of said bellows once the pressure of said medium fluid reaches a predetermined lower limit.

27. The pressure compensator of claim 17, wherein said biasing means comprises a plurality of springs selected from the group consisting of compression springs, tension springs, and combinations thereof.

28. The pressure compensator of claim 17, wherein said pressure compensator comprises means for expanding said expandable container when the volume of said medium fluid is reduced.

29. In a method of pumping a well fluid from a seabed well, the steps comprising:

providing a submerged motor and pump contained in a housing connected to a wellhead for pumping said well fluid;

supplying a medium fluid to said submerged motor and pump for cooling and lubricating said motor and pump;

providing a submerged pressure compensator outside the housing of the submerged motor and pump comprising an expandable container having an interior volume in communication with said well fluid and an exterior surface in communication with said medium fluid; and mechanically biasing said expandable container against said medium fluid to pressurize said medium fluid at a differential pressure above the pressure of said well fluid.

* * * * *